H. O. MASON.
BUTTER-WORKER.

No. 181,274. Patented Aug. 22, 1876.

Attest:
Inventor
Homer O. Mason
By Coburn & Thacher
Attorneys

N. PETERS, PHOTO-LITHOGRAPHER, WASHINGTON, D. C.

UNITED STATES PATENT OFFICE.

HOMER O. MASON, OF DUNDEE, ILLINOIS.

IMPROVEMENT IN BUTTER-WORKERS.

Specification forming part of Letters Patent No. 181,274, dated August 22, 1876; application filed May 8, 1876.

*To all whom it may concern:*

Be it known that I, HOMER O. MASON, of Dundee, in the county of Kane and State of Illinois, have invented a new and useful Improvement in Butter-Workers, which is fully described in the following specification, reference being had to the accompanying drawings, in which—

Figure 1:
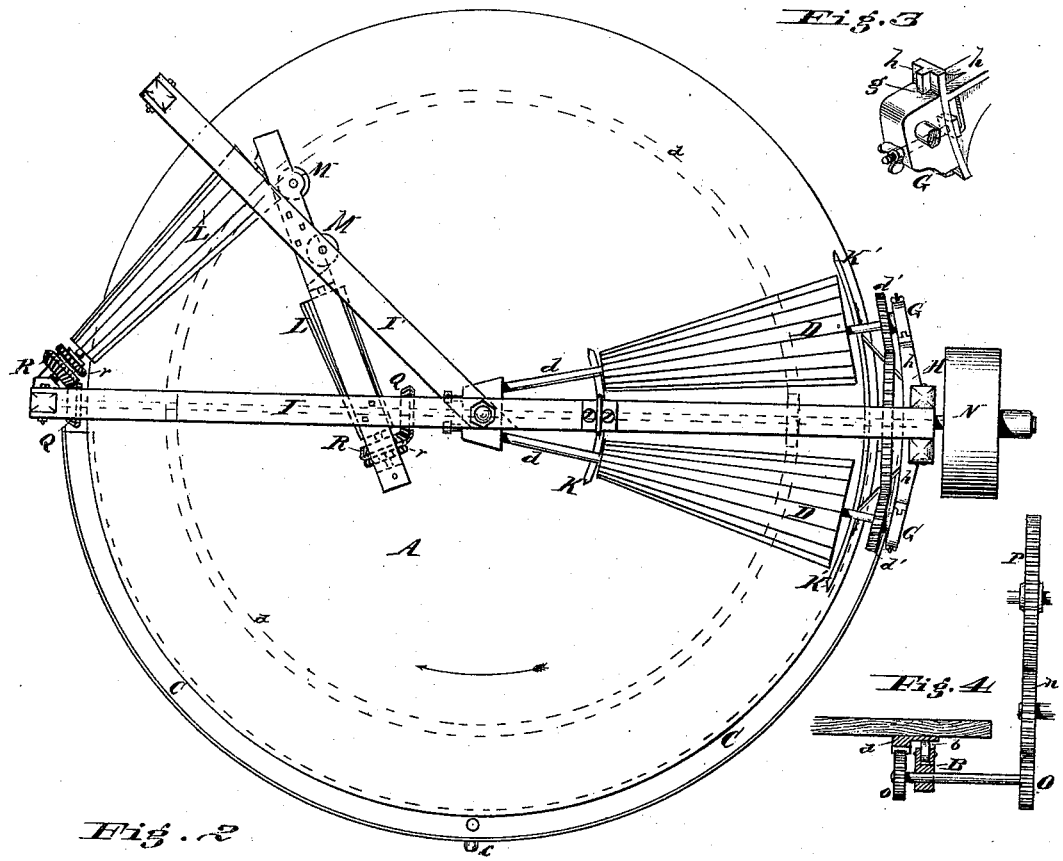
Figure 3:
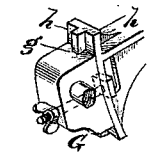
Figure 4:
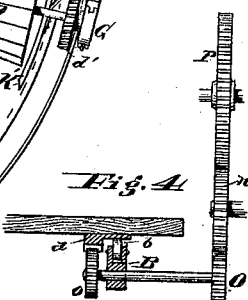
Figure 2:
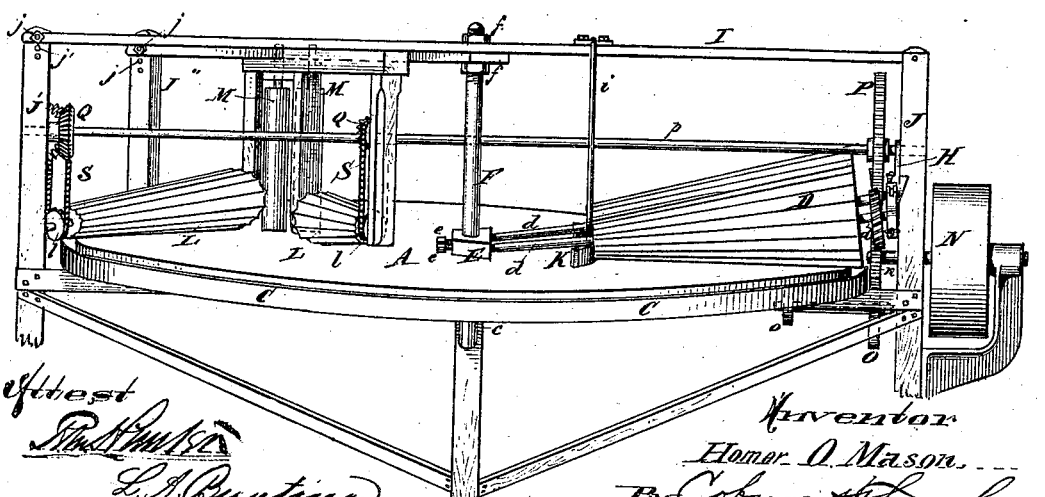

Figure 1 represents a plan view of the machine; Fig. 2, a front elevation of the same; Fig. 3, a detail view of the device for adjusting the outer ends of the working-rollers, and Fig. 4 a detail view of the driving gearing.

My invention relates to machines for working over butter to express the buttermilk, and to form the butter into rolls. The invention consists in the combination of two rollers for working the butter with two others for turning it and forming rolls; also, in the combination, with a revolving circular table, of a circular trough to receive the buttermilk; also, in making the rollers adjustable, and also in various other details of construction, which will hereinafter be fully set forth.

In the drawings, A represents a revolving circular table, which is supported upon a suitable frame, and is provided upon its under side with a circular gear-plate, a. This plate a is securely fastened to the bottom of the table, and, for a portion of its width, presents a plain surface, which constitutes a bearing-surface, resting upon anti-friction rollers b, which are journaled in boxes B, resting upon the horizontal cross-bars of the supporting-frame. The supporting-frame is constructed so that the table A will be slightly inclined; and in front of the lower side of the table is placed a semicircular trough, C, also supported upon the frame and arranged just under the edge of the table, so as to receive the buttermilk which is expressed by the rollers. The trough is provided with a spout, c, to convey off the buttermilk from the trough into any suitable receptacle. Two conical corrugated rollers, D, are mounted upon shafts d, and arranged just above the upper surface of the table. The roller-shafts are journaled at their inner ends in a block, E, which is placed upon a post, F, projecting above the center of the table, and is adjustable thereon, being fixed in any desired position by means of set-screws e.

The outer ends of the shafts d are journaled in boxes G, which have their inner surfaces slightly concave, and provided with a groove, g. These boxes G are adjustable upon the arms h of a gear-frame, H, the arms being provided with a rib or tongue, h', which fits in the groove g of the boxes G, and also being curved to correspond with the inner face of the boxes, the latter are adjustable thereon in the arc of a circle, and are held in any position desired by means of a bolt and set-screw, g'.

The rollers D are intended to work over the butter as it is brought underneath them by the revolution of the table A, and, as both ends of their shafts are adjustable, the distance from the table may be regulated to accommodate the quantity and condition of the butter. A cross-beam, I, extends across the machine above the table, and is supported upon the upright posts of the frame, which project above said table.

A hanger, i, depends from this cross-bar I, to the lower end of which is attached a curved inner guide or fender, K, just below the shafts of the rollers D, and at the inner ends of said rollers. A corresponding curved guide or fender, K', is situated just outside of the outer ends of the same rollers, and supported by arms attached to one of the posts of the supporting-frame. These guides or fenders shape the mass of butter as it passes under the working-rollers D D, bringing it into suitable form to be received by the turning-rollers L L, which are arranged just above the table A, and at an angle to each other, as shown in the drawings. The rollers L L have their journal-bearings in pendent frames, supported by the cross-bars I I', the latter of which extend from the upright post F to one of the posts of the supporting-frame. One end of the outside roller L may be journaled in the post J¹ of the frame, as shown in Figs. 1 and 2 of the drawings, if desired. In the pendent frames which support the rollers L L are also journaled two upright rollers, M M, which are placed just outside of the rear ends of the rollers L L, and a little nearer together than these ends, so as to compress the roll of butter somewhat more after it passes from the rollers L L. The rollers M M have no positive motion, but turn freely as the butter passes between them. A driving-pulley, N, is mounted upon a shaft, in suitable bearings upon the frame, and upon the inner end of the shaft is a gear-wheel, $n$. The gear-wheel $n$ meshes with a gear-wheel, O, on a shaft just below the table, on the inner end of which is fixed a pinion, $o$, which meshes with the circular rack $a$ attached to the table A. The gear-wheel $n$ also meshes with a wheel, P, placed just above it, and fixed upon a shaft, $p$, which extends entirely across the machine above the table A, having its bearings in the frame H and post $J^1$. The shaft $p$ meshes with pinions $d'$ on the shaft $d$ on each side of the wheel P, by means of which motion is communicated to the rollers D. Upon the shaft $p$ are also fixed beveled pinions Q, which engage with corresponding pinions R R, supported on one of the pendent frames and post $J^1$. On the same shaft with the pinions R R, and, if desired, attached to said pinions, are sprocket-wheels $r$ $r$, over which drive-chains S pass, and also under corresponding sprocket-wheels $l$ on the shafts of the rollers L. The frame H is rigidly attached to the post J, and is so constructed with suitable arms and projections that all of the gearing on that side of the machine is journaled, at least partially, in said frame. The cross-bar I is pivoted to the post J, and both it and the bar I' are held in position on the post F by screw-nuts $f$, above and below them, the upper end of the post F being threaded for this purpose. The other ends of the bars I and I' are attached to the posts $J^1$ $J^2$, respectively, by pins or bolts $j$ passing through the bars, and any one of a series of holes, $j'$, in said posts, the ends of the bars being recessed to receive the posts.

It will be seen by this construction that the distance of the rollers L from the table A may be adjusted by adjusting the bars I I' upon the posts $J^1$, $J^2$, and F, the nuts $f$ being turned up or down on the latter for this purpose. Only a slight adjustment can be made however, or the gearing will be disturbed; but it will be sufficient for all practical purposes.

The machinery may be driven by a band running about the pulley N, for the purpose of transmitting power from any suitable mechanism; or a crank may be attached to the pulley, and the machinery turned by hand.

The operation of my invention is as follows: The pulley N being turned to the right, motion will be communicated from the gear-wheel $n$, by means of the driving mechanism heretofore described, to the table A and the rollers D L. The table A is caused to revolve in the direction indicated by the arrows, and the mass of butter placed thereon, upon the upper side, is carried around underneath the rollers D, by which it is compressed, and the buttermilk forced out, which runs off into the trough C. As the butter passes out from beneath the rollers D it represents the section of a broad flat ring, this form having been given to it by the action of the guides or fenders K K. In this condition it is carried forward into the opening between the rollers L L, by the action of which the edges are rolled up and the mass gradually compressed, the rollers being placed at an angle to each other, and rotated outward to accomplish this result. The partially forward roll is then carried between the upright rollers M M, by which it is still further compressed and given the form and appearance of a roll. This roll of butter is carried around under the rollers D again, and the operation continued until the buttermilk is well worked out, the two sets of rollers operating together to secure a very satisfactory result in this direction.

Having thus described my invention, what I claim as new, and desire to secure by Letters Patent, is—

1. The combination of the revolving table A, inclined to its axis of motion, working-rollers D, and the independent stationary trough C, arranged substantially as and for the purpose set forth.

2. The combination of the working-rollers D, turning-rollers L, arranged at angles to each other, and a revolving table, A, substantially as and for the purpose set forth.

3. The combination of the block E, adjustable on the post F, and shafts $d$, for the purpose of adjusting the height of the inner ends of the rollers D, substantially as described.

4. The combination of the shafts $d$ and curved boxes G, adjustable, as described, on the frame H, for the purpose of adjusting the outer ends of the rollers D, substantially as set forth.

5. The frame I I', pivoted at one end to the supporting-frame J, and adjustable on the parts F, $J^1$, and $J^2$, substantially as described, in combination with the rollers L suspended from said frame, for the purpose of adjusting the height of the rollers, as set forth.

HOMER O. MASON.

Witnesses:
C. E. GRIFFITH,
B. T. McEUEN.